United States Patent [19]
Enokida et al.

[11] Patent Number: 5,818,537
[45] Date of Patent: Oct. 6, 1998

[54] IMAGE PROCESSING METHOD AND APPARATUS FOR CONVERTING BETWEEN DATA CODED IN DIFFERENT FORMATS

[75] Inventors: Miyuki Enokida, Yokohama; Hidefumi Ohsawa, Kawaguchi, both of Japan

[73] Assignee: Canon Kabushiki Kaisha, Tokyo, Japan

[21] Appl. No.: 758,465

[22] Filed: Dec. 2, 1996

Related U.S. Application Data

[63] Continuation of Ser. No. 365,419, Dec. 28, 1994, abandoned.

[30] Foreign Application Priority Data

Dec. 28, 1993 [JP] Japan ................................. 5-336702
Jan. 31, 1994 [JP] Japan ................................. 6-009889

[51] Int. Cl.$^6$ ..................................................... H04N 7/13
[52] U.S. Cl. .......................................... 348/441; 348/459
[58] Field of Search .................................. 348/441, 442, 348/443, 444, 445, 446, 448, 450, 451, 452, 453, 454, 455, 456, 457, 458, 495

[56] References Cited

U.S. PATENT DOCUMENTS

| | | | |
|---|---|---|---|
| 4,768,228 | 8/1988 | Clupper et al. | 348/478 |
| 5,056,117 | 10/1991 | Gitlin et al. | 375/341 |
| 5,068,724 | 11/1991 | Krause et al. | 358/133 |
| 5,146,325 | 9/1992 | Ng | 348/439 |
| 5,262,854 | 11/1993 | Ng | 348/416 |
| 5,267,334 | 11/1993 | Normille et al. | 348/409 |
| 5,270,813 | 12/1993 | Puri et al. | 348/384 |
| 5,305,113 | 4/1994 | Iwamura et al. | 358/335 |
| 5,414,469 | 5/1995 | Gonzales et al. | 348/416 |
| 5,418,569 | 5/1995 | Ando | 348/415 |
| 5,430,489 | 7/1995 | Richards et al. | 348/446 |
| 5,444,491 | 8/1995 | Lim | 348/441 |

*Primary Examiner*—Najhan J. Flynn
*Attorney, Agent, or Firm*—Fitzpatrick, Cella, Harper & Scinto

[57] ABSTRACT

Image processing method and apparatus for converting between data encoded in different formats includes structure and steps for converting motion image data into first digital coded motion image data having a first encoding format and capable of being transmitted to a medium. The first digital coded motion image data is then converted into second digital coded motion image data without decoding entirely the first digital coded motion image data. The second digital coded motion image data has a second encoding format different from the first encoding format. Preferably, the second digital coded motion image data has a digital data amount which is less than that of the first digital coded motion image data.

40 Claims, 10 Drawing Sheets

FIG.5(a) OUTPUT BY 11

FIG.5(b) OUTPUT BY 12

FIG.5(c) OUTPUT BY 12

IMAGE PROCESSING METHOD AND APPARATUS FOR CONVERTING BETWEEN DATA CODED IN DIFFERENT FORMATS

This application is a continuation of application Ser. No. 08/365,419, filed Dec. 28, 1994, now abandoned.

BACKGROUND OF THE INVENTION

1. Field of the Invention

This invention relates to image processing method and apparatus for converting image signals between encoding formats, and more particularly to method and apparatus for encoding first digital encoded motion image signals into second digital encoded motion image signals of a different format.

2. Description of Related Art

In a system for recording and/or monitoring an image signal from a video camera to a digital video recorder (located at a distance from the video camera) through a communication line, a high quality image encoding method is typically used for recording, and a high compression rate image encoding method is typically used for monitoring.

The high compression rate method is used in the image encoding method for monitoring because the data communication rate of the communication line is typically limited.

To achieve a high quality image for monitoring, however, a lower compression rate is used in the image encoding method. However, the lower compression rate encoding method needs a communication line that has a data communication rate equal to that of the digital recorder. Therefore, the system is limited by the communication line, or it is necessary to reduce the quality of the image. Alternatively, two encoders may be provided, each having a different compression rate. Therefore the construction of the apparatuses used in the above-described systems is complex. This is a problem to be solved.

The MPEG-I (Motion Picture Experts Group-I) encoding method for storing motion image data, and the H.261 encoding method for communicating motion image data are known. The compression rate of the MPEG method, whose bit rate is 1.5 Mbit/sec, is relatively low. The algorithm of this method is complex because the method emphasizes image quality over real time encoding.

In contrast, the compression rate of the H.261 method, whose bit rate is P×64 kbit/sec (where P is an integer), is relatively high. The algorithm of this method is simple because it emphasizes real time encoding. However, when transmitting the encoded motion image data produced by the H.261 method, it is required to encode motion image data into encoded data whose bit rate is less than or equal to the rate of the communication line.

Furthermore, even when the system is connected to a high communication rate line, the reproduced image will only be as good as the encoder coupled to the communication line, which is a problem when the encoder encodes the motion image data using a high compression rate method.

Moreover, when the system is connected to a low communication rate line, even if the encoder encodes the motion image data using a high compression rate, the reproduced image will not be as good as a high quality image.

A low communication rate line cannot transmit data encoded by the MPEG method in real time because the data rate of the MPEG method is higher than that of the H.261 method. Therefore, a low communication rate line used only for TV conferencing or a video telephone cannot transmit in real time the motion image data encoded by the MPEG method. To transmit the data encoded by the MPEG method in real time, it is necessary to change the communication line to a high communication rate line that has enough transmitting capacity for transmitting that data encoded by the MPEG method.

These shortcomings will also occur when other data compression methods are used having different compression rates.

SUMMARY OF THE INVENTION

An object of the present invention is to solve or alleviate the above-explained shortcomings.

Another object of the present invention is to provide method and apparatus for generating different kinds of coded data having different compression rates.

Still another object of the present invention is to provide method and apparatus for transmitting coded data through different kinds of transmission media having different communication rates.

Still another object of the present invention is to convert data coded by the MPEG method to data coded by the H.261 method, or vice versa.

According to one aspect of the present invention, there is provided an image processing method comprising the steps of (i) providing first digital coded image data having a first encoding format and capable of being transmitted to a recording medium, and (ii) converting the first digital coded image data into second digital coded image data without decoding entirely the first digital coded image data, the second digital coded motion image data having a second encoding format different from the first encoding format. Preferably, the second digital coded motion image data has a digital data amount which is less than that of the first coded image data.

According to another aspect of the present invention, an image processing apparatus comprises providing means for providing first coded motion image data having a first encoding format capable of being transmitted to a recording medium. Converting means is provided for converting the first coded motion image data into second coded motion image data without decoding entirely the first coded motion image data, the second coded motion image data having a second encoding format different form the first encoding format and, preferably, having a digital data amount which is less than that of the first coded motion image data.

The foregoing and still other objects and advantages of the present invention will become fully apparent from the following description to be taken in conjunction with attached drawings.

DETAILED DESCRIPTION OF THE PRESENTLY PREFERRED EMBODIMENTS

First Embodiment

Figure 1:
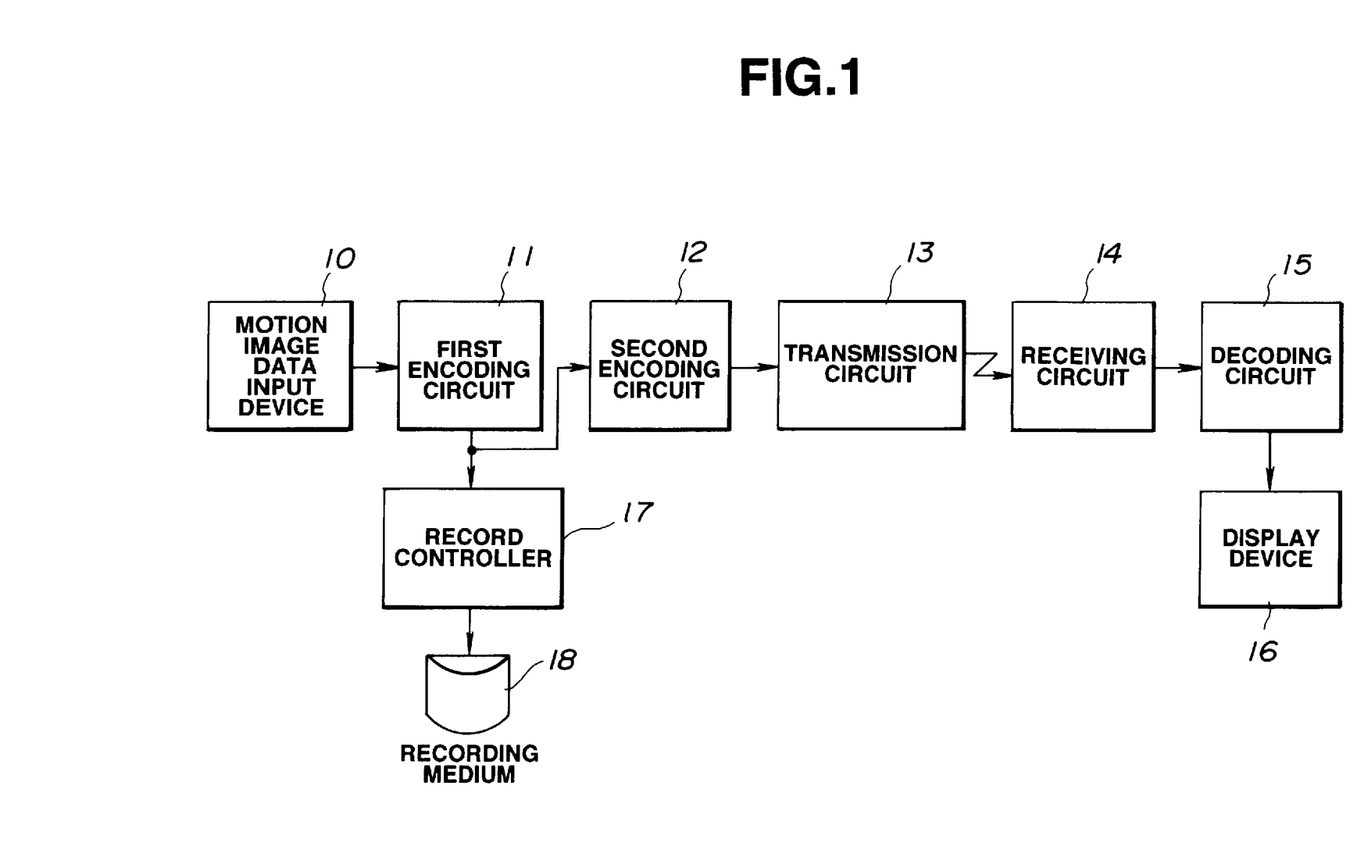
FIG. 1 is a block diagram of a first embodiment according to the present invention.

FIG. 1 is a block diagram of a first embodiment according to the present invention.

Referring to FIG. 1, 10 is a motion image data input device for inputting digital motion image data. 11 is a first encoding circuit for encoding the motion image data input by the motion image data input device 10. The input device 10 and the first encoding circuit 11 may comprise a digital video camera. 12 is a second encoding circuit for further encoding the motion image data encoded by the first encoding circuit 11. 13 is a transmission circuit for transmitting the motion image data encoded by the second encoding circuit 12. 14 is a receiving circuit for receiving the motion image data transmitted by the transmission circuit 13. 15 is a decoding circuit for decoding the motion image data received by the receiving circuit 14. 16 is a display device for displaying an image corresponding to the decoded motion image data. 17 is a record controller for controlling the recording of the encoded signal onto a recording medium 18. 18 is the recording medium.

The operation of the first embodiment as illustrated in FIG. 1 will now be explained. The motion image data input device 10 converts motion image data from e.g., a video camera into digital motion image data and outputs the digital image data to the first encoding circuit 11.

The first encoding circuit 11 encodes the digital motion image data by using a relatively low compression rate parameter. The first encoding circuit performs the encoding operation using, e.g., the MPEG method. The data encoded by the first encoding circuit 11 is transmitted to the record controller 17, and is recorded on the recording medium 18.

The second encoding circuit 12 produces second encoded digital data by replacing a portion of the digital data encoded by the first encoding circuit 11 with a copy command. This replacement operation will be explained later (see e.g. FIGS. 5(a)–5(c)). The encoded data produced by the second encoding circuit 12 is transmitted to receiving circuit 14 through the transmission circuit 13, and is decoded by the decoding circuit 15. Therefore the display circuit 16 displays an image corresponding to the signal output by the decoding circuit 15.

Figure 2:
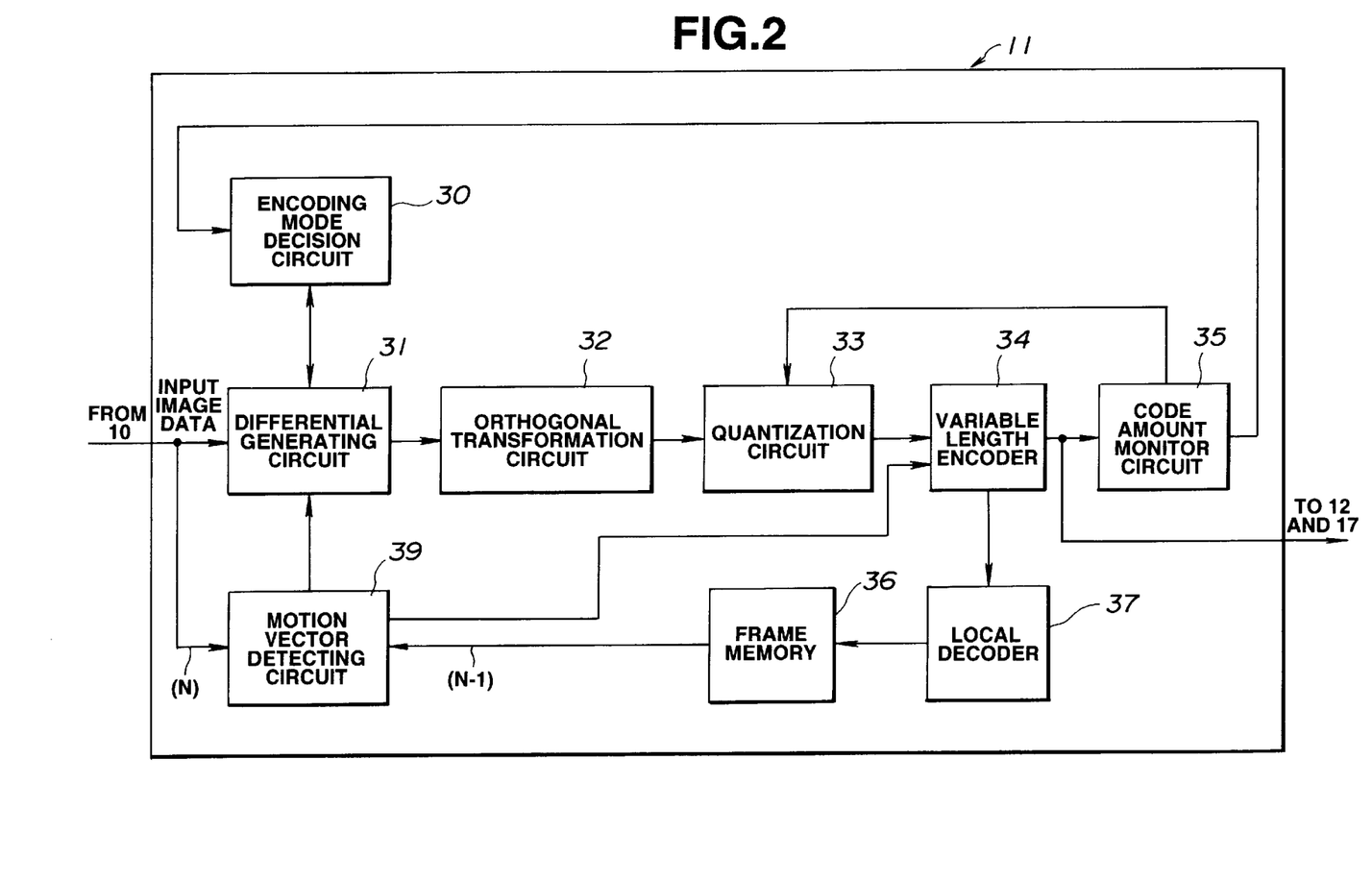
FIG. 2 is a block diagram of the encoder illustrated in FIG. 1.

FIG. 2 is a block diagram of the first encoding circuit 11 illustrated in FIG. 1.

Referring to FIG. 2, 30 is an encoding mode decision circuit for generating an instruction to change the circuit between an inter frame encoding mode and an intra frame encoding mode (to be described below). 31 is a differential generating circuit for obtaining a differential between an encoded frame and a frame to be encoded in an inter frame encoding operation, and for performing motion compensation based on a motion vector received from motion vector detecting circuit 34 (to be described below). Circuit 31 also may output a frame to be encoded, as it is, in an intra frame encoding operation.

32 is an orthogonal transformation circuit for transforming input image data into frequency components. 33 is a quantization circuit for quantizing the output from the orthogonal transformation circuit 32 in accordance with an output of a code amount monitor circuit 35 (to be described below). 34 is a variable length encoder for encoding the output from the quantization circuit 33. 35 is the code amount monitor circuit for monitoring the code amount (i.e., the quantity of code, see FIGS. 5(a)–5(c) for different code amounts) of the code output by said quantization circuit 34, and for controlling the quantizing step used by the quantization circuit 33. The code amount monitor circuit 35 determines the quantization level for a specific frame in accordance with the code amount of the frame (N−1) before the specific frame (N). 37 is a local decoder for generating an image to be provided to a reproduction circuit (in decoding circuit 15, FIG. 1) by decoding the encoded image data and outputting it to a frame memory 36.

39 is a motion vector detecting circuit for detecting motion between an image block of a present frame (N) and an image block of a previous frame (N−1) shown in FIG. 2.

Figure 3A:
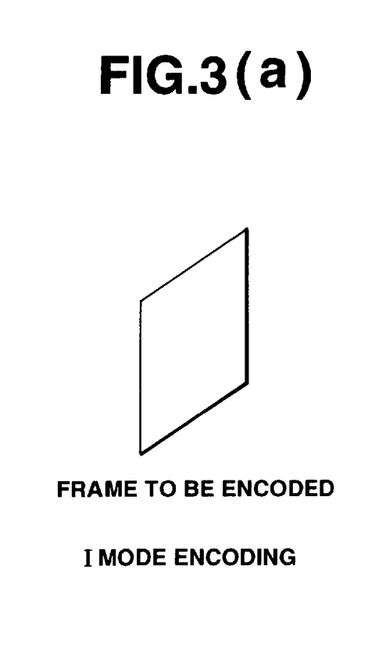
FIGS. 3(a), 3(b), 3(c) comprise a diagram for explaining the plural encoding modes of the FIG. 2 encoder.
Figure 3B:
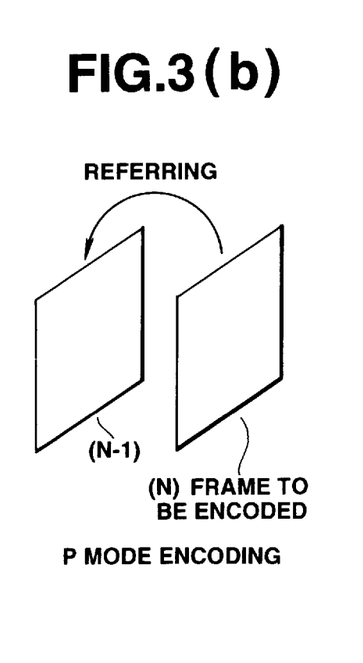

The encoding mode determined by the encoding mode decision circuit 30 will be explained by using FIGS. 3(a), 3 (b), and 3 (c).

There are three encoding modes, one intra frame encoding mode and two inter frame encoding modes. The first encoding mode is the intra frame mode (I mode), the second encoding mode is a forward prediction inter frame mode (P mode), and the third encoding mode is a both direction prediction inter frame mode (B mode). In the second encoding mode (P mode), a motion vector is detected by the motion vector detecting circuit 39 between the previously encoded frame (N−1) and frame to be encoded (N). Motion compensation is then performed by the differential generating circuit 31 after it has obtained the differential between the frames (N) and (N−1), and the differential component is processed by circuits 32, 33, 34 and 35.

The third encoding mode (B mode) is the both direction prediction mode. In the third encoding mode, two motion vectors are detected, one of them being a motion vector between the previously encoded frame (N−1) and the frame to be encoded (N). The other motion vector is one between the following encoded frame (N+1) and the frame to be encoded (N). The motion is compensated by the circuit 31 with respect to the (N) frame and the (N−1) and (N+1) frames, and two differential components are obtained, and the smaller one of the two differential components is processed by circuits 32, 33, 34, and 35.

In the P mode and the B mode, a copy command is provided for copying the P mode or B mode data from the previous frame. The copy command is a code representing that the differential component between the frames is "0" and the motion vector is "0" (see FIGS. 5(a)–5(c) for the copy command).

Figure 4:
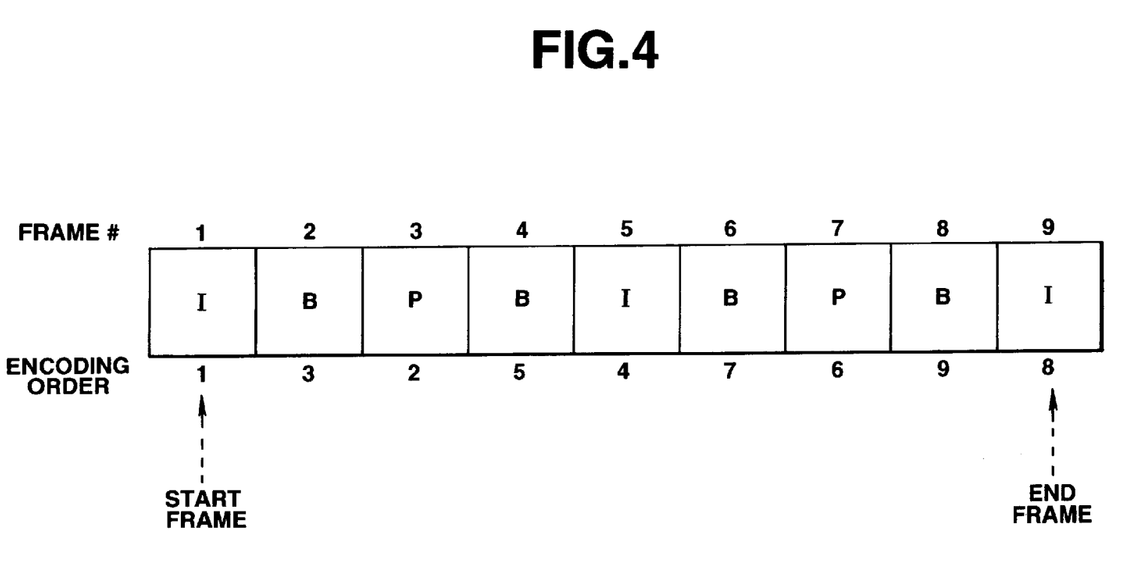
FIG. 4 is a diagram of the frame format of the encoded motion image data.

FIG. 4 is a diagram of the frame format of the encoded motion image data obtained by the embodiment described in FIG. 2. Frames 1, 5 and 9 are encoded using the I mode, and frames 3, 7 are encoded using the P mode referring to frames 1, 5 respectively. Frames 2, 4, 6 and 8 (between frames encoded using the I mode and frames encoded using the P mode) are encoded using the B mode.

Figure 5A:
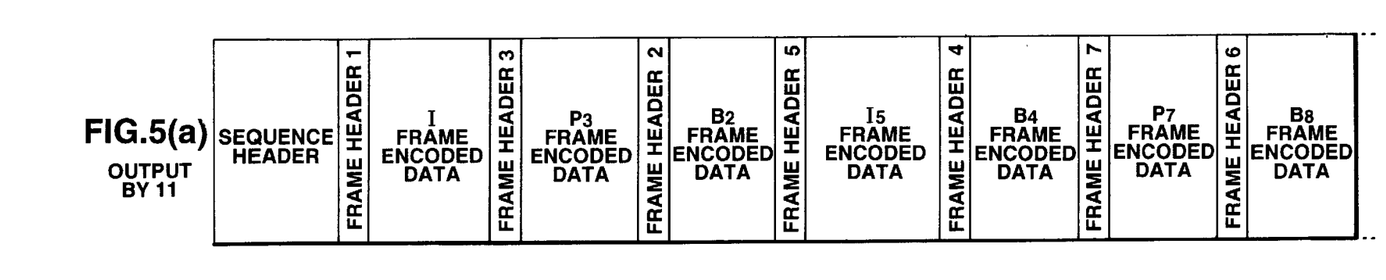
FIGS. 5(a), 5(b), and 5(c) comprise a detailed diagram of FIG. 4.
Figure 5B:
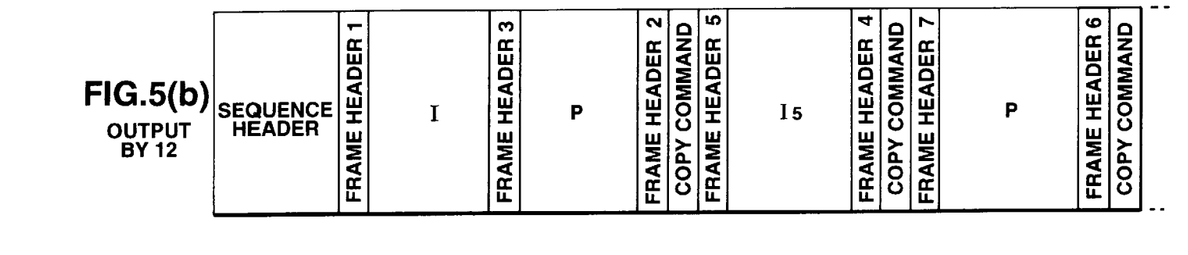
Figure 5C:
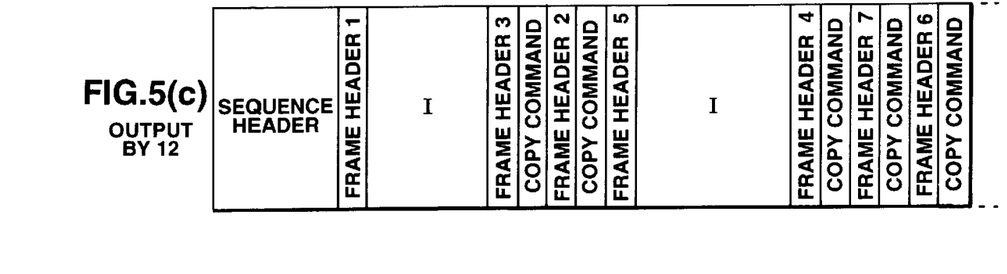

FIGS. 5(a), 5(b), and 5(c) comprise a detailed diagram of FIG. 4.

FIG. 5(a) represents the encoded data output by the first encoding circuit 11. The sequence header includes information to decode the encoded signal, e.g., the number of frames per 1 sec and the size of the frame. As shown in FIG. 5(a), I frame encoded data, P frame encoded data, B frame encoded data, and frame headers for each of the frames are continuously output following the sequence header.

FIG. 5(b) is the encoded data in which the B frame encoded data from FIG. 5(a) is replaced by the copy commands. FIG. 5(b) is output by the second encoding circuit 12.

The replacement of the B frame encoded data by the copy command is a simple process, and the copy command is very short. Therefore, the second encoding circuit 12 can reduce the amount of encoded image data by this simple process.

However, if the encoded data (in which the B frame encoded data is replaced by the copy command) is decoded, the motion of the decoded image may be slightly worse (in accordance with the percentage of the B frame encoded data in the whole encoded data of FIG. 5(a)), since the B frame encoded data was obtained from a previous frame.

As shown in FIG. 5(c), the copy command can replace not only the B frame encoded data but also the P frame encoded data, and the amount of encoded image data is further reduced. However, in this case, the motion of the decoded image may be even worse since the P frame encoded data is also obtained from a previous frame. These replacements are performed by the second encoding circuit 12.

According to the present embodiment, a reduction in the amount of the encoded image data, as shown in FIGS. 5(a), 5(b), and 5(c) can be obtained, and decoding the encoded data is also simplified. By decoding using software instead of hardware, the reduction in data amount makes the process time shorter because in decoding using software, if the total commands are reduced, the process time is shorter.

In software decoding, copy commands can be easily detected by a code matching method because copy commands are a short commands. The detected copy commands are converted into freeze commands sent to frame memory without really performing a copying operation of the decoded image data. In hardware decoding, performing the copy commands exactly is also easy because the copy command is a short command that is easily handled. However, the software method is presently preferred because detecting the copy commands by the code matching method and replacement of the command by a freeze command is simpler.

Therefore, according to the present embodiment, the decoding process can be simpler both in software decoding and in hardware decoding.

Second Embodiment

In case the transmission line for transmitting the encoded data is not a fixed data communication rate line, but a variable data communication rate line (such as a local area network), it is possible to control the amount of transmitted encoded data by selecting one of the data shown in FIGS. 5(a), 5(b), or 5(c) in accordance with the traffic detected on the line.

In detail, if the traffic is light, the frequency of the replacement of the data with the copy command can be made less. If the traffic is heavy, the frequency of the replacement of the data with the copy command can be made larger. This can be determined and adjusted by controller 17.

Third Embodiment

In previous embodiments, the sequence header of the encoded data output by the first encoding circuit 11 and the second encoding circuit 12 are the same. However, it is also possible to change the number of frames per sec included in the sequence header of the encoded data output by the second encoding circuit 12.

In this case, B frame encoded data is deleted from the output of the first encoding circuit 11, without replacing B frame encoded data with the copy command, so that code data including only I frame coded data and P frame coded data are generated. Alternatively, code data including only I frame coded data is generated.

These replacements can be performed by the second encoding circuit 12 controlled by controller 17.

Fourth Embodiment

This invention can also be applied to a process wherein the image data from a single motion image data input device 10 is transmitted simultaneously through plural lines A, B, and C whose transmission rates are different from each other.

Figure 6:
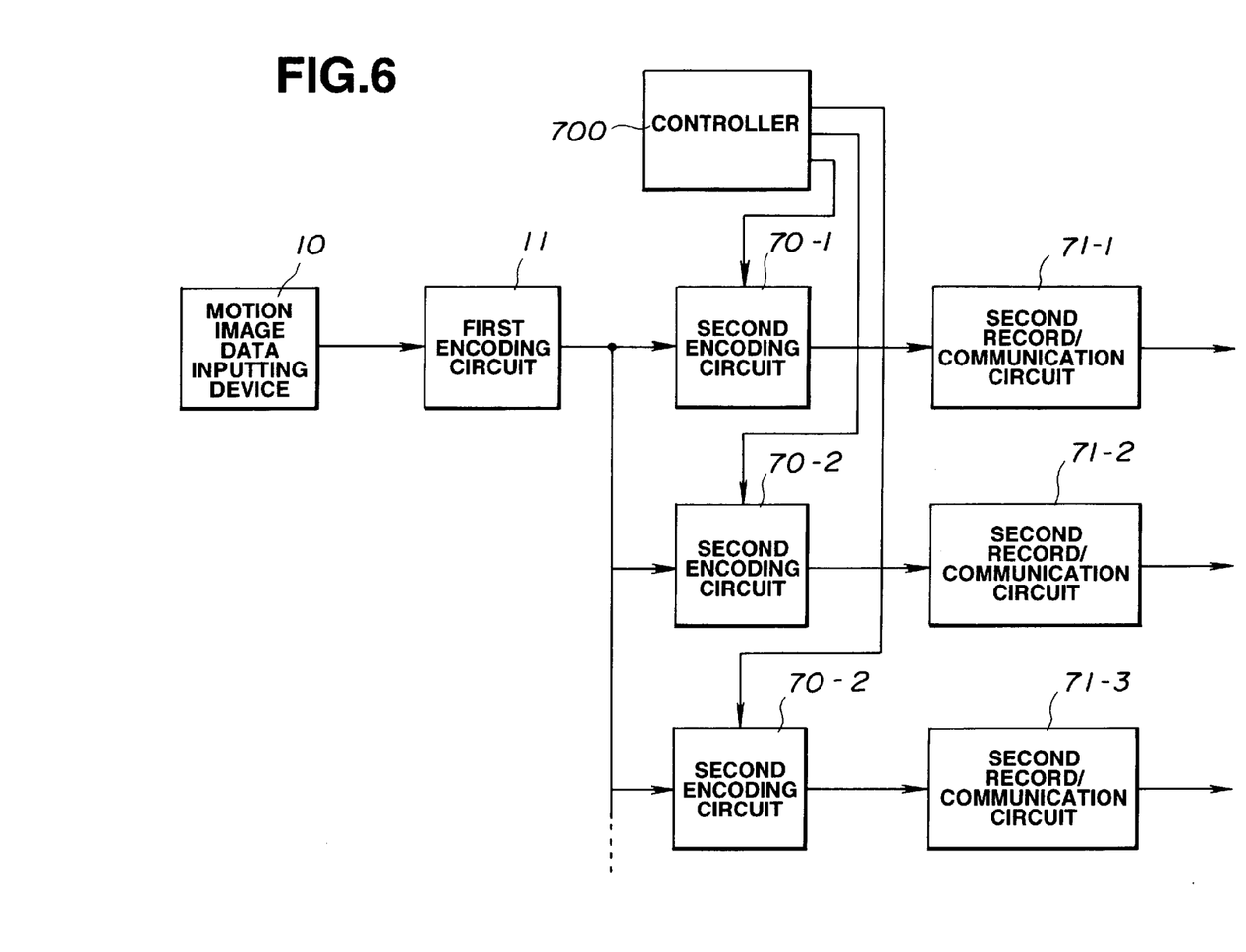
FIG. 6 is a block diagram of a fourth embodiment according to the present invention and enables transmission through plural communication lines.

Referring to FIG. 6, plural second encoding circuits 70-1, 70-2, 70-3 and a controller 700 (for controlling each of the plural second encoding circuits) are provided in order to select one of the plural outputs shown in FIGS. 5(a), 5(b) and 5(c) independently for each channel. Each of the second encoding circuits 70-1, 70-2, 70-3 is respectively connected to each of second record/communication circuits 71-1, 71-2, 71-3.

In the above described embodiment, it is possible to record high quality images on one channel and to suppress the amount of data to be transmitted on a different channel.

Fifth Embodiment

Figure 7:
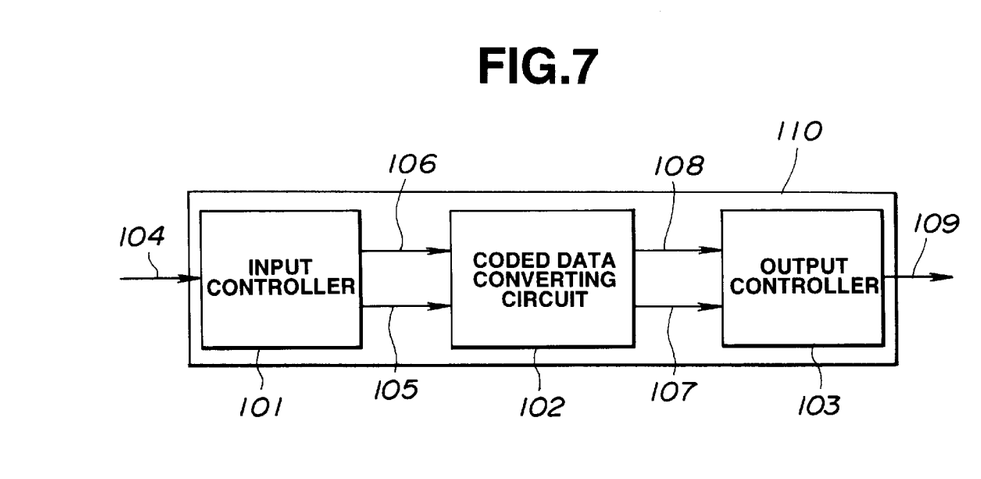
FIG. 7 is a block diagram of a fifth embodiment according to the present invention.

FIG. 7 is a block diagram of a fifth embodiment of the present invention. Referring to FIG. 7, 101 is an input controller for inputting encoded motion image data through an external communication line 104, and for separating the data into video data 106 and audio data 105. 102 is a coded data converting circuit for converting video data 106 and audio data 105 into other forms 108, 107, respectively (e.g. MPEG to H.261, to be described more fully below). 103 is an output controller for transmitting converted video data 108 and converted audio data 107 through the external communication line 109. 110 represents a whole image data conversion circuit.

In this embodiment, the motion image encoded data input through line 104 is encoded by the MPEG method and the motion image encoded data to be output is encoded by the H.261 method, i.e., image data conversion circuit 110 converts data encoded by the MPEG method into data encoded by the H.261 method.

Figure 8:
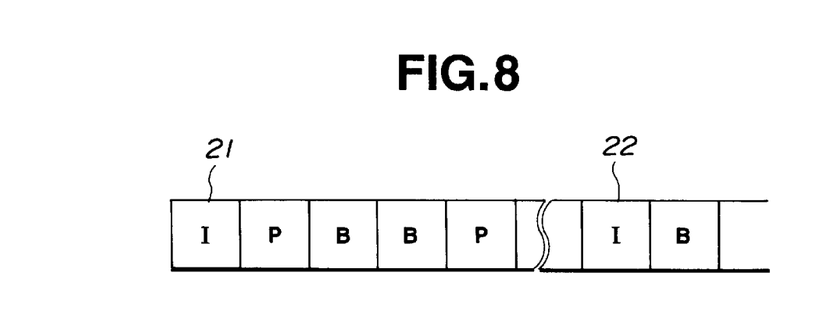
FIG. 8 is a diagram for showing a format of data encoded by the MPEG method.

FIG. 8 is a diagram for showing a format of data encoded by the MPEG method.

In this embodiment, I frame encoded data 21, 22 of the motion image data encoded by the MPEG method is generated every 15 frames, and each frame is encoded at a rate of 30 frames per sec. On the other hand, in the H.261 method, each frame is encoded at a rate of 2 frames per sec.

Figure 9:
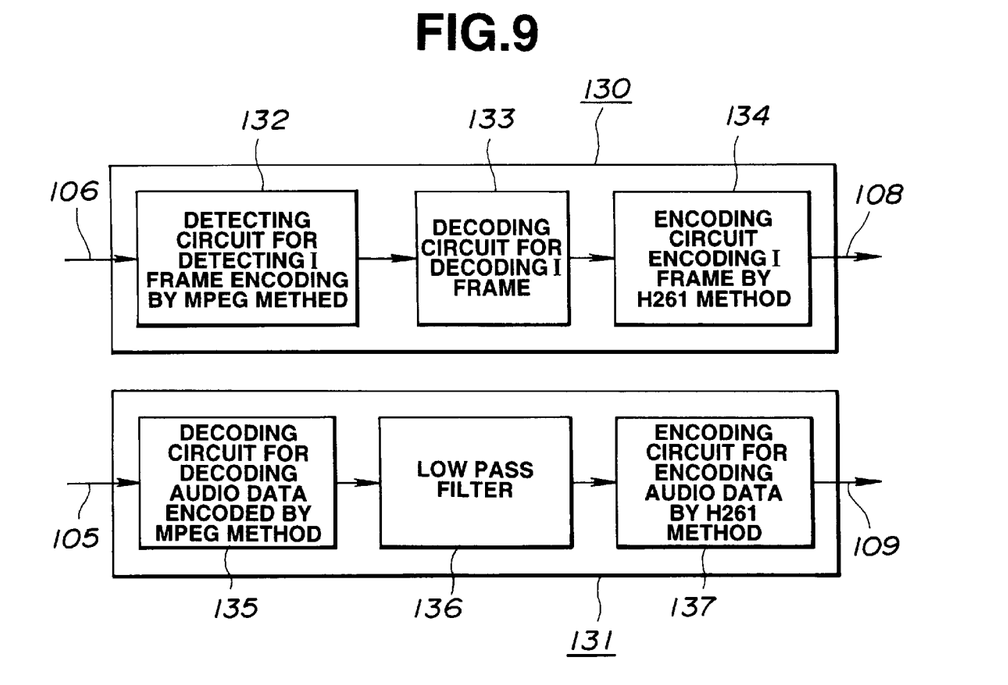
FIG. 9 is a detailed diagram of code conversion circuit 102 of FIG. 7.

FIG. 9 is a detailed diagram of the code converting circuit 102 of FIG. 7. In FIG. 9, 130 is a video converting circuit for converting video data 106 into video data 108 that is suitable for the H.261 method, and 131 is an audio converting circuit for converting audio data 105 into audio data 109 that is suitable for the H.261 method.

132 is a detecting circuit for detecting I frame encoded data (among video data 108) encoded by the MPEG method. The detecting circuit 132 detects a header included in each frame of the video data 108 encoded by the MPEG method. 133 is a decoding circuit for decoding I frame encoded data that is encoded by the MPEG method, and for outputting decoded I frame data. 134 is an encoding circuit for encoding the decoded I frame data output by the circuit 133, and for outputting I frame encoded data that is suitable to the H.261 method. 135 is a decoding circuit for decoding audio data encoded by the MPEG method. 136 is a low pass filter for cutting off a high frequency component included in the output of the decoding circuit 135. 137 is an encoding circuit for encoding audio data, output through the low pass filter 136, in accordance with the H.261 method.

In the embodiment shown in FIG. 9, data encoded at a 30 frame per sec rate by the MPEG method is converted into data encoded at 2 frames per sec in accordance with the H.261 method.

The I frame encoded data is generated every 15 frames by the MPEG method in this embodiment; therefore only I frame encoded data is decoded, and it is converted into data suitable to the H.261 method by the video converting circuit 130.

The audio converting circuit 131 converts the audio data encoded by the MPEG method into audio data encoded by the H.261 method, as the video converting circuit 130 converts the video data. However, if the encoding rate of the encoding circuit 137 (that is for H.261) is high, the low pass filter 136 can be deleted.

To convert image data encoded by the MPEG method into image data encoded by the H.261 method, it is possible to decode entirely the coded image data and re-encode the decoded image data, or it is possible to decode a required part of the coded image data and re-encode the decoded image data.

The coded audio data will be processed similarly to the coded video data.

Sixth Embodiment

The apparatus described in the fifth embodiment extracts only I frame coded data and converts it from one encoding method to another. The apparatus in the sixth embodiment extracts I frame coded data and other frames that are not I frame coded data and converts them. In this apparatus, data coded at 30 frames per sec is converted into data coded at 6 frames per sec.

Figure 10:
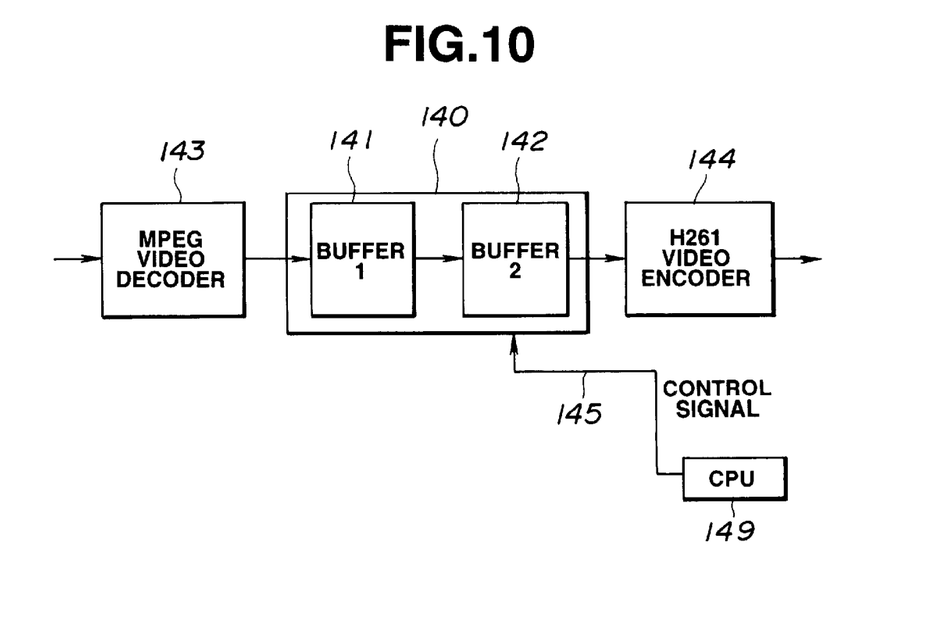
FIG. 10 is a detailed diagram of an alternative construction of code conversion circuit 102 of FIG. 7.

FIG. 10 is a detailed diagram of another construction of the coded data converting circuit 102 of FIG. 7. Referring to FIG. 10, 140 is a buffer memory including a first buffer memory 142 that stores the output from a MPEG video decoder 143, and a second buffer memory 142 that stores data to be input into the H.261 video encoder 144. Data transmitted from buffer 141 to buffer 142 is controlled by a control signal 145 produced by CPU 149.

As previously mentioned, the apparatus described in this embodiment converts data coded at 30 frames per sec into data coded at 6 frames per sec. Therefore, this apparatus decodes data coded by the MPEG method and encodes the decoded data using the H.261 method. MPEG video decoder 143 decodes input data coded by the MPEG method and outputs decoded image data to buffer 141. CPU 149 produce the control signal 145 for buffer 140 such that the decoded data is transferred from buffer 141 to buffer 142 every five frames in this embodiment.

H.261 encoder 144 encodes image data from buffer 142 using the H.261 method. The encoding processing for the audio data is similar to that of the fifth embodiment.

The invention is not limited to 6 frames per sec or 30 frames per sec as described above.

Since the data rate of the H.261 method is lower than that of the MPEG method generally, the data encoded by the MPEG method is converted into the data encoded by H.261 method. However, this invention is not limited by the above embodiments; this invention can also be applied to a conversion of data encoded by the H.261 method into data encoded by the MPEG method, or from data encoded by the H.261 method into data encoded by the H.261 method (e.g., 8 frames per second to 2 frames per second), or from data encoded by the MPEG method into data encoded by the MPEG method (e.g., different frame rates).

In the above embodiment, the frame rate of the data encoded by the MPEG method is changed. However, if the encoder 144, (coupled to the data output side) has a function of altering the data transfer rate without changing the frame rate, the CPU 149 may change the compression rate by e.g. altering the quantization level used in the encoder. If plural kinds of decoding circuits (e.g., an MPEG decoder and a H.261 decoder) are provided, it is possible to select one of the plural kinds of decoding circuits in accordance with the kind of input encoded motion image data.

The encoding portion of the data outputting side can be provided with plural kinds of decoders.

Seventh Embodiment

Figure 11:
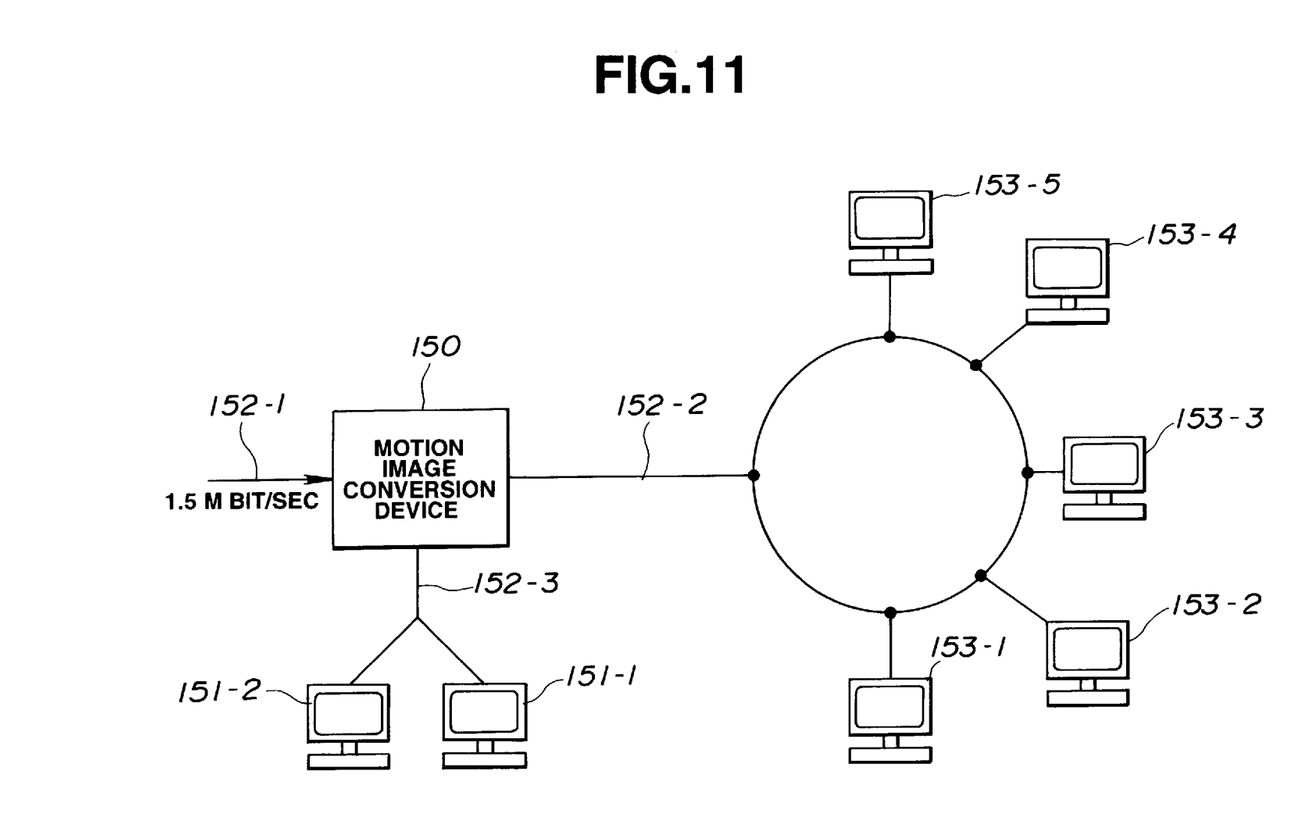
FIG. 11 is a diagram of a seventh embodiment according to the present invention.

The following embodiment utilizes the network structural communication lines and communication equipment shown in FIG. 11.

Referring to FIG. 11, 150 is a motion image conversion device, 152-1-152-3 are communication lines, while 153-1-153-5, 151-1, and 151-2 are communication devices (e.g. Personal Computers) each having a display device.

In this example, the data transmission rates of the communication lines 152-1, 152-3 are 1.5M bit/sec, while the rate of the line 152-2 is 128K bit/sec. A decoder for the H.261 method encoded data is provided for each of the communication devices 153-1-153-5, and a decoder for the MPEG encoded data is provided for each of the communication devices 151-1, 151-2.

The detail of the motion image conversion device 150 will now be explained with reference to FIG. 12.

Figure 12:
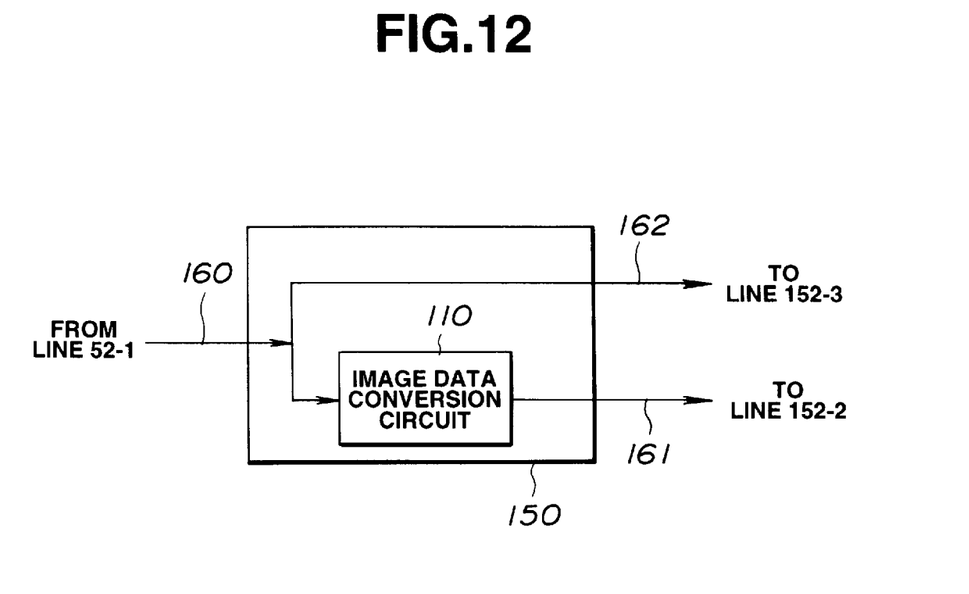
FIG. 12 is a detailed diagram of conversion device 150 described in FIG. 11.

Referring FIG. 12, 160 is input digital motion image data, and 161, 162 are output motion image data. The output signal 162 is the same as the input signal 160. The output signal 161 is output from image data conversion circuit 110 described in FIG. 7, so the signal 161 is converted by the circuit 110 in accordance with a given control signal 145 shown in FIG. 10.

Referring FIG. 11 and FIG. 12, since the communication devices 151-1, 151-2 are each provided with an MPEG decoder, the signal 162 is transmitted through the communication line 152-3 connected to the devices 151-1, 151-2. And the signal 161 is transmitted through the communication line 152-2 to the devices 153-1-153-5.

The operation of this embodiment, when data encoded by the MPEG method at 1.5M bit/sec is inputted from an external source, will now be explained.

In this case, the communication devices 151-1, 151-2 receive the MPEG encoded data at 1.5M bit/sec as it is. The MPEG decoders provided in each of the communication devices 151-1, 151-2 decodes the encoded data, so the display device of each of the devices 151-1, 151-2 displays a good quality image defined by 1.5M bit/sec.

The communication devices 153-1 to 153-5 receive the data converted by the image data conversion circuit 110 through the line 152-2.

The image data conversion circuit 110 converts the 1.5M bit/sec MPEG encoded data into data encoded by the H.261 method at a rate of 128K bit/sec.

The H.261 decoders provided for each communication device 153-1 to 153-5 decodes the data converted by the conversion circuit 110, so the display of each of the devices 153-1 to 153-5 displays an image defined by 128K bit/sec.

The motion image conversion process of conversion circuit 110 can be automatically controlled by CPU 149 (shown in FIG. 10) in accordance with the detection of the data transmission rate of the communication line.

In this embodiment, the network supports two different transmission rates. However, this invention is not limited to such an embodiment. This invention can be applied to networks which support many different transmission rates by providing the conversion circuit 110 at a switching circuit on the communication lines where the data transmission rate may be changed. Also, the transmission rate is not limited to the disclosed 1.5M bit/sec, or 128K bit/sec rates.

Further, the encoding method is not limited to the MPEG method and the H.261 method. This invention can be applied to the MPEG-II method, the vector quantizing method, or an encoding method for encoding all frames by interframe encoding. This invention is especially effective in converting between plural encoding methods whose frame rates are different.

In addition, this invention can be applied not only to motion image data, but also to plural data types having correlations with each other. For example, the present invention can also be applied to still image data.

Moreover, this invention can be applied not only to transmissions between a communication line and a monitor, but also between other kinds of mediums such as disc storage devices, semiconductor memories, etc.

Furthermore, this invention is applicable not only to systems including computers and software, but also to hardware systems.

According to above-described embodiments, the present invention can generate plural kinds of encoded data whose transmission and/or compression rates are different from each other.

According to the present invention, each of plural communication devices can reproduce the most desirable real-time motion image in accordance with the transmission rate of the communication line connected to each communication device.

According to the present invention, the encoding method may be easily changed so that when encoded data (which is not compatible with the communication device) is input, the communication device may nevertheless display the image corresponding to the input encoded data.

The individual components shown in outline or designated by blocks in the Drawings are all well-known in the image processing arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Image processing apparatus comprising:
    input means for inputting a first encoded motion image data stream having a first frame rate, said first encoded motion image data stream including (i) intra frame coded image data and (ii) inter frame coded image data which is different from the intra frame coded image data;
    selection means for selecting a particular code of the first encoded motion image data stream;
    decoding means for decoding the first encoded motion image data selected by said selection means;
    coding means for encoding image data decoded by said decoding means to form a second encoded motion image data stream having a second frame rate different from the first frame rate; and
    outputting means for outputting the second encoded motion image data coded by said coding means.

2. Image processing apparatus according to claim 1, wherein said decoding means extracts said intra frame code image data from the first encoded motion image data.

3. Image processing apparatus according to claim 1, wherein said second frame rate is lower than said first frame rate.

4. Image processing apparatus according to claim 1, wherein said input means for inputting inputs said first encoded motion image data from a first network.

5. Image processing apparatus according to claim 4, wherein said outputting means for outputting outputs said second encoded motion image data to a second network.

6. An image processing method comprising the steps of:
    providing a first digital coded motion image data stream having a first encoding format and capable of being transmitted to a medium, the first digital coded motion image data stream including (i) intra frame coded image data and (ii) inter frame coded image data which is different from the intra frame coded image data;
    selecting a particular code of the first digital coded motion image data;
    decoding the first digital coded motion image data selected in said selecting step, said decoding step including the steps of extracting a predetermined code from said first digital coded motion image data and outputting said predetermined code; and
    encoding the image data decoded by said decoding step to form a second digital coded motion image data stream, the second digital coded motion image data having a second encoding format different from the first encoding format.

7. An image processing of method according to claim 6, wherein said converting step includes the steps of extracting a particular code from said first coded image date and replacing it with a copy code.

8. An image processing method according to claim 7, wherein said first digital coded image data includes (i) intra frame coded image data and (ii) inter frame coded image data which is different from the intra frame coded image data.

9. An image processing method according to claim 8, wherein said particular code comprises a portion of said inter frame coded image data.

10. An image processing method according to claim 6, wherein said predetermined code comprises intra frame coded image data.

11. An image processing method according to claim 6, wherein said first digital coded motion image data is supplied by a video camera.

12. An image processing method according to claim 6, wherein said medium comprises a communication network.

13. An image processing method according to claim 6, wherein said medium comprises a recording medium.

14. An image processing method according to claim 6, wherein the second digital coded motion image data has a digital data amount which is lower than a digital data amount of the first digital coded image data.

15. Image processing apparatus comprising:
    providing means for providing a first digital coded image data stream capable of being transmitted to a medium, the first digital coded image data stream including (i) intra frame coded image data and (ii) inter frame coded image data which is different from the intra frame coded image data;

selecting means for selecting a particular code of the first digital coded image data stream, decoding means for decoding the first digital coded image data selected by said selecting means; and coding means for encoding image data decoded by said decoding means to form second digital coded image data, the second digital coded image data having a digital data amount which is less than the digital data amount of the first digital coded image data.

16. Image processing apparatus according to claim 15, wherein said converting means includes means for replacing a particular code of said first digital coded image data with a copy code.

17. Image processing apparatus according to claim 15, wherein said particular code comprises a portion of said inter frame coded image data.

18. Image processing apparatus, according to claim 15, wherein said decoding means includes means for extracting a predetermined code included in said first digital coded image data, and for outputting the extracted code.

19. Image processing apparatus according to claim 33, wherein said predetermined code comprises intra frame coded image data.

20. Image processing apparatus according to claim 15, wherein said digital coded motion image data is supplied by a video camera.

21. Image processing apparatus according to claim 15, wherein said medium comprises a communication network.

22. Image processing apparatus according to claim 15, wherein said medium comprises a recording medium.

23. An image processing method comprising the steps of:

providing a first digital coded motion image data stream capable of being transmitted to a medium, the first digital coded motion image data stream including (i) intra frame coded image data and (ii) inter frame coded image data which is different from the intra frame coded image data;

selecting a particular code of the first coded motion image data stream;

decoding the first digital coded motion image data selected by said selecting step, said decoding step including the steps of extracting a predetermined code from said first digital coded motion image data stream and outputting said predetermined code; and encoding image data decoded by said decoding step to form a second digital coded motion image data stream, the second digital coded motion image data having a digital data amount which is less than a digital data amount of the first digital coded motion image data.

24. An image processing of method according to claim 23, wherein said converting step includes the steps of extracting a particular code from said first digital coded image date and replacing it with a copy code.

25. An image processing method according to claim 24, wherein said first digital coded image data includes (i) intra frame coded image data and (ii) inter frame coded image data which is different from the intra frame coded image data.

26. An image processing method according to claim 25, wherein said particular code comprises a portion of said inter frame coded image data.

27. An image processing method according to claim 23, wherein said predetermined code comprises intra frame coded image data.

28. An image processing method according to claim 23, wherein said digital coded motion image data is supplied by a video camera.

29. An image processing method according to claim 23, wherein said medium comprises a communication network.

30. An image processing method according to claim 23, wherein said medium comprises a recording medium.

31. Image processing apparatus comprising:

input means for inputting first encoded motion image data stream including intra frame coded image data and inter frame coded image data which is different from the intra frame coded image data, said first encoded motion image data stream having a first frame rate;

decoding means for decoding the first encoded motion image data;

selection means for selecting a decoding operation of said decoding means;

coding means for encoding image data decoded by said decoding means to form a second encoded motion image data stream having a second frame rate different from the first frame rate; and outputting means for outputting the second encoded motion image data coded by said coding means.

32. Apparatus according to claim 31, wherein said decoding means extracts said intra frame coded image data from the first encoded motion image data stream.

33. Apparatus according to claim 31, wherein said second frame rate is lower than said first frame rate.

34. Apparatus according to claim 31, wherein said input means inputs said first encoded motion image data stream from a first network.

35. Apparatus according to claim 31, wherein said outputting means outputs said second encoded motion image data stream to a second network.

36. An image processing method comprising the steps of:

an input step for inputting first encoded motion image data including intra frame coded image data and inter frame coded image data which is different from the intra frame coded image data, said first encoded motion image data stream having a first frame rate;

a decoding step for decoding the first encoded motion image data;

a selection step for selecting a decoding operation of said decoding step;

a coding step for encoding image data decoded by said decoding step to form a second encoded motion image data stream having a second frame rate which is different from the first frame rate; and an outputting step for outputting the second encoded motion image data coded by said coding step.

37. A method according to claim 36, wherein said decoding step includes the step of extracting said intra frame code image data from the first encoded motion image data stream.

38. A method according to claim 36, wherein the second frame rate is lower than the first frame rate.

39. A method according to claim 36, wherein said input step inputs said first encoded motion image data stream from a first network.

40. A method according to claim 36, wherein said outputting step outputs said second encoded motion image data stream to a second network.

* * * * *

UNITED STATES PATENT AND TRADEMARK OFFICE
CERTIFICATE OF CORRECTION

PATENT NO. : 5,818,537

DATED : October 6, 1998

INVENTOR(S) : MIYUKI ENOKIDA, ET AL.

Figure 3C:
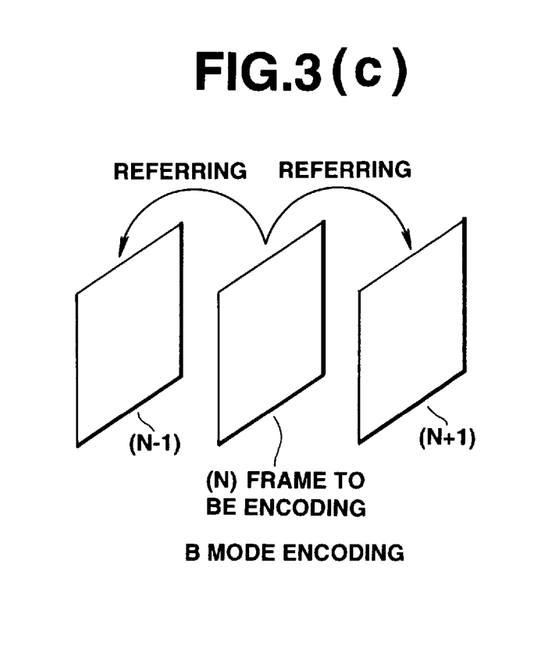

It is certified that error appears in the above-identified patent and that said Letters Patent is hereby corrected as shown below:

IN THE DRAWINGS:

Sheet 3, Figure 3(c) "BE ENCODING" should read --BE ENCODED--.

COLUMN 1:

Line 44, "real time" should read --real-time--; and
    Line 48, "real time" should read --real-time--.

COLUMN 2:

Line 45, "form" should read --from--; and
    Line 58, "3(b), 3(c)" should read --3(b), and 3(c)--.

COLUMN 5:

Line 35, "a" should be deleted.

COLUMN 7:

Line 51, "produce" should read --produces--.

COLUMN 10:

Line 38, "of" should be deleted; and
    Line 40, "date" should read --data--.

UNITED STATES PATENT AND TRADEMARK OFFICE
CERTIFICATE OF CORRECTION

PATENT NO. : 5,818,537

DATED : October 6, 1998

INVENTOR(S) : MIYUKI ENOKIDA, ET AL.

It is certified that error appears in the above-identified patent and that said Letters Patent is hereby corrected as shown below:

COLUMN 11:

Line 25, "claim 33," should read --claim 18,--;
    Line 55, "of" should be deleted; and
    Line 57, "date" should read --data--.

Signed and Sealed this

Eighth Day of June, 1999

Attest:

Q. TODD DICKINSON

*Attesting Officer*     *Acting Commissioner of Patents and Trademarks*